United States Patent [19]

Haig et al.

[11] Patent Number: 5,286,686
[45] Date of Patent: * Feb. 15, 1994

[54] AIR-SINTERABLE LANTHANUM CHROMITE AND PROCESS FOR ITS PREPARATION

[75] Inventors: Stephen Haig, Piscataway; Beili L. Wu; Jean Yamanis, both of Morristown, all of N.J.

[73] Assignee: Allied-Signal Inc., Morristown, N.J.

[*] Notice: The portion of the term of this patent subsequent to Dec. 8, 2009 has been disclaimed.

[21] Appl. No.: 981,633

[22] Filed: Nov. 25, 1992

Related U.S. Application Data

[63] Continuation-in-part of Ser. No. 826,194, Jan. 21, 1992, Pat. No. 5,185,301, which is a continuation of Ser. No. 511,708, Apr. 20, 1990, abandoned.

[51] Int. Cl.$^5$ .................... C04B 35/04; C04B 35/51; C01G 39/00
[52] U.S. Cl. .................... 501/117; 501/126; 501/132; 423/352; 423/592; 423/595; 423/606; 423/604; 423/622; 264/82; 264/83
[58] Field of Search ........... 501/12, 117, 126, 132; 252/518; 423/352, 592, 595, 604, 607, 622, 606; 264/82, 83

[56] References Cited

U.S. PATENT DOCUMENTS

| | | | |
|---|---|---|---|
| 3,974,108 | 8/1976 | Staut et al. | 252/521 |
| 4,749,632 | 6/1988 | Flandermeyer et al. | 501/152 |
| 4,830,780 | 5/1989 | Olson et al. | 252/521 |
| 5,169,811 | 12/1992 | Cipollini et al. | 501/117 |
| 5,185,301 | 2/1993 | Li et al. | 501/117 |

OTHER PUBLICATIONS

Groupp & Anderson, "Densification of $La_{1-x}Sr_xCrO_3$", J. Am. Cer. Soc., 59, p. 449 (1976).

Meadowcroft & Wimmer, "Oxidation and Vaporization Processes in Lanthanum Chromite", Am. Ceram. Soc. Bull., vol. 58, pp. 610–613 (1979).

Vidyasagar et al. "Synthesis of Compolex Metal Oxides Using Hydroxide, Cyanide and Nitrate Solid Solution Precursors", J. Solid State Chem., 58, 29–37 (1985).

Hayashi et al. "Sintering of lanthanum chromite doped with zinc or copper", J. Mater. Sci. Lett., vol. 7, pp. 457–458 (1988).

*Primary Examiner*—Mark L. Bell
*Assistant Examiner*—Michael A. Marcheschi
*Attorney, Agent, or Firm*—Ernest D. Buff; Gerhard H. Fuchs

[57] ABSTRACT

A sinter-reactive lanthanum chromite powder is prepared from the lanthanum chromite precursor $LaCr_{1-x}M_xO_3$ (Adsorbate). The powder is crystalline, has the formula $LaCr_{1-x}M_xO_3$, where M is selected from the group consisting of zinc, copper and mixtures thereof and x ranges from about 0.02 to 0.2, and sinters to densities higher than about 95% of theoretical density at temperature as low as 1400° C. in oxidizing atmospheres. Sintering to such high density at temperatures in the vicinity of 1400° C. makes the powder particularly suited for use as interconnect material for solid oxide fuel cells.

5 Claims, No Drawings

AIR-SINTERABLE LANTHANUM CHROMITE AND PROCESS FOR ITS PREPARATION

CROSS REFERENCE TO RELATED APPLICATIONS

This is a continuation-in-part of U.S. application Ser. No. 07/826,194, filed Jan. 21, 1992, now U.S. Pat. No. 5,185,301 which, in turn, is a File-Wrapper-Continuation of application Ser. No. 07/511,708, filed Apr. 20, 1990, now abandoned.

BACKGROUND OF THE INVENTION

1. Field of the Invention

This invention relates to the field of electroceramics, and more particularly to a sinter-reactive lanthanum chromide ceramic especially suited for use in a solid oxide fuel cell.

2. Description of the Prior Art

Solid oxide fuel cells (SOFC) have high potential in producing electrical energy from cheap fuels or by-product waste gas streams of the petrochemical and metallurgical industries. The potential of these fuel cells lies in the high efficiency of converting chemical to electrical energy and could find extensive applications in the domestic, commercial, defense, and aerospace sectors of the economy. The realization of this potential is contingent on the development of reliable and cost efficient methods of cell fabrication.

One of the solid oxide fuel cell designs resembles a heat exchanger with a honeycomb structure in which the electroactive ceramic components also serve as the structural members and eliminate the need for inert supports. This design is referred to as the monolithic solid oxide fuel cell (MSOFC). The honeycomb structure of the MSOFC is made up of thin layers of four components: (1) anode, usually made of a nickel-zirconia cermet; (2) electrolyte, made of a fully stabilized (cubic) zirconia; (3) cathode, made of strontium-doped lanthanum manganite ($LaMnO_3$); and, (4) interconnect, made of doped lanthanum chromite ($LaCrO_3$). The adjacent anode, electrolyte, and cathode layers make up one cell while the interconnect serves as an internal electrical connection between individual cells.

The monolithic solid oxide fuel cell offers lower material costs, the potential for reduced manufacturing costs, and a higher efficiency over other geometries and designs. However, fabrication of these cells is expected to be more complicated because the individual components in thin sheet form must be formed into multilayer sheets which are then converted into a honeycomb structure and must be cosintered at the same relatively low temperature. Of particular importance is the sintering behavior of the interconnect material, that is, lanthanum chromite which must be sintered to close porosity or about 94% of its theoretical density.

Lanthanum chromite is a refractory material with a melting point of 2510° C. which requires very high temperatures and controlled atmospheres, i.e. extremely low partial pressures of oxygen for sintering to near theoretical density. Groupp and Anderson (L. Groupp and H. U. Anderson, J. Am. Ceram. Soc., 59, 449 (1976)) have shown that $LaCrO_3$ does not sinter in air even at temperatures as high as 1720° C. According to the data reported by these investigators, $LaCrO_3$ could be sintered to 95.3% TD only at 1740° C. and in an atmosphere of nitrogen having an oxygen partial pressure of $10^{-11}$ atm. The main inhibition to densification appears to be the volatilization of chromium oxides in oxidizing atmospheres. The oxidation and volatilization of lanthanum chromite in oxidizing atmospheres at temperatures higher than 1400° C. has indeed been reported by Meadowcroft and Wimmer (75th Annual Meeting of the Am. Ceram. Soc., Cincinnati, (1973) and D. B. Meadowcroft and J. M. Wimmer, Am. Ceram. Soc. Bull., vol. 58, 610 (1979)) and involves the oxidation of Cr(III) to Cr(VI) and formation of fugitive $CrO_3$ which is a gas at the high temperatures of sintering. Therefore, the preparation of lanthanum chromite powders which sinter to close porosity at temperatures below 1650° C. so that Cr volatilization is minimized is critical for the development of monolithic solid oxide fuel cell fabrication technology. One method of fabricating lanthanum chromite ($LaCrO_3$) electrodes is disclosed in U.S. Pat. No. 3,974,108. This patent teaches the preparation of strontium-doped lanthanum chromite, i.e., lanthanum chromite in which lanthanum is partly substituted by strontium having, from lanthanum oxide, strontium carbonate and chromic acid by slurry mixing these materials, drying the slurry and then firing the dried powder mixture in air at temperatures in the preferred range of 1200° to 1500° C. The resultant fired powder is strontium-doped lanthanum chromite which sinters only at temperatures in excess of 1700° C.

An alternative approach is to use sol-gel technology to prepare high surface area, i.e., very fine grain, and sinter reactive $LaCrO_3$ powders compacts of which sinter to full density at temperatures lower than 1700° C. Reduction in sintering temperature is achieved by controlling the composition, homogeneity, grain size, and morphology of the powder. This control is brought about by solution chemistry and improved powder separation and processing technology. One such method for preparing lanthanum chromite has been disclosed by C. N. Rao et al. "Synthesis of Complex Metal Oxides Using Hydroxide, Cyanide and Nitrate Solid Solution Precursors", J. Solid State Chem., vol. 58, 29–37 (1985). This method consists of coprecipitation of lanthanum and chromium hydroxides which are intimately mixed and essentially constitute a solid solution of $LaCr(OH)_6$. This hydroxide solid solution is converted to $LaCrO_3$ by calcination at 850° C. for 12 hours.

Specifically, Rao et al. teach the coprecipitation of $LaCr(OH)_6$ by adding an aqueous nitrate solution of metal ions to a sodium hydroxide solution with subsequent extensive washing of the resultant hydroxide gel to remove sodium ions. Removal of sodium ions from the gel is required because even a very low concentration of sodium ion markedly changes the properties of the gel and degrades the properties of the resultant lanthanum chromite powder. Moreover, Rao et al. state that ammonium hydroxide base could not be used to coprecipitate a hydroxide containing a divalent metal such as magnesium or strontium which are frequently used as dopants of lanthanum chromite.

In contrast to the teachings of Rao et al., an improved sol-gel method has been disclosed by U.S. Pat. No. 4,830,780, to Olson et al., for the preparation of lanthanum chromite doped with the divalent ions of magnesium, strontium, calcium or barium by coprecipitation from salt solutions of lanthanum, chromium and dopant ions with ammonium hydroxide. According to Olson et al., extensive washing of the precipitated gel is not needed because residual ammonium ion is removed via the gas phase during powder calcination. Upon calcination at temperatures of about 600° C., the gel converts to a single compound with the huttonite structure, LaCrO$_4$, which upon further calcination at 900° C. converts to pure lanthanum chromite, LaCrO$_3$, with average particle size of about 0.5 μm. The single phase composition of this powder and its fine grain size are in sharp contrast to the powder which is derived by following the teachings of Rao et al. The lanthanum chromite powder prepared according to the teachings of U.S. Pat. No. 4,830,780 could be sintered to 95.7% theoretical density at 1650° C. for 4 hours in a graphite furnace and to 78% theoretical density at 1600° C. for 2 hours in a furnace with oxygen partial pressure of 10$^{-10}$ atmospheres. Densification of this lanthanum chromite to the indicated densities was much better than what was achievable by the powders of the prior art, such as those disclosed by Groupp and Anderson.

S. Hayashi et al. utilize another approach for lowering the sintering temperature of lanthanum chromite. In J. Mater. Sci. Lett., vol. 7, p. 457 (1988), Hayashi et al. are said to have prepared chromite powders in which chromium was partially substituted by zinc or copper. They prepared these zinc- or copper-doped chromite powders by standard ceramic techniques, that is, mixing of component oxide powders, calcination of the powder mixtures, and size reduction. Hayashi et al. formed compacts of the chromite powders by uniaxial pressing under 100 MPa pressure, followed by cold isostatic pressing under 300 MPa pressure. These compacts had a high green density of about 60% of theoretical and upon firing in air at 1600° C. for 2 hours achieved a density of about 98% of theoretical when the concentration of zinc was 10 or 15 mol % or the copper concentration was 5, 10 or 15 mol %. The sintering of the zinc- or copper-doped chromites, prepared by Hayashi et al., to high density in air, i.e., oxidizing atmosphere is in sharp contrast to the behavior of strontium- or magnesium-doped chromites which require a reducing atmosphere. However, the sintering temperature of 1600° C. for the powders of Hayashi et al. is still very high and the need to prepare powders which sinter at lower temperatures and especially close to 1400° C. still exists.

SUMMARY OF THE INVENTION

This invention provides a method (1) for preparation of a precursor of lanthanum chromite powder, (2) for preparation of sinter-reactive lanthanum chromite powder, and (3) for preparation of both the precursor and the sinter-reactive lanthanum chromite powders.

In one embodiment, the present invention comprises a lanthanum chromite precursor powder which is amorphous or microcrystalline and has the empirical formula LaCr$_{1-x}$M$_x$O$_3$ (Adsorbate) where M is a divalent metal selected from the group consisting of zinc, copper and mixtures thereof, x is in the range of 0.02 to 0.20, and Adsorbate is volatile matter which is adsorbed on the powder. The composition of the Adsorbate consists essentially of water, alcohols and other organic adducts. The amount of the Adsorbate may be up to about 35 weight percent of the total as-produced lanthanum chromite precursor.

In another embodiment, the invention comprises a process for the preparation of the lanthanum chromite precursor powder having the empirical formula LaCr$_{1-x}$M$_x$O$_3$ (Adsorbate) where M is a divalent metal selected from the group consisting of zinc, copper and mixtures thereof, x ranges from 0.02 to 0.20, and Adsorbate is volatile matter which is adsorbed on the powder and which is present up to 35 weight percent based on total precursor weight, the process comprising the steps of:

(a) reacting a solution containing a lanthanum compound and a chromium compound in an atomic ratio of La:Cr of 1:1−x with a stoichiometric excess of ammonium hydroxide to precipitate an intermediate hydroxide in the form of a slurry;

(b) washing the precipitated intermediate hydroxide with a wash liquid comprising deionized (DI) water and DI water/alcohol mixtures to remove most of the anions from the lanthanum and chromium compounds used in step (a) and to yield a slurry in a water/alcohol liquid;

(c) adding to the hydroxide slurry obtained in step (b) a solution of an M compound taken in such quantity as to yield an atomic ratio of La:Cr:M of 1:1−x:x where M is a divalent metal selected from the group consisting of zinc, copper and mixtures thereof and is operative as a dopant, (d) separating the powder from the water/alcohol liquid at supercritical conditions wherein temperature and pressure are equal to or greater than the critical point of the water/alcohol liquid in a batch or continuous process to obtain the precursor lanthanum chromite powder with empirical formula LaCr$_{1-x}$M$_x$O$_3$ (Adsorbate)

In still another embodiment of the invention, a sinter-reactive lanthanum chromite powder is prepared from the lanthanum chromite precursor LaCr$_{1-x}$M$_x$O$_3$ (Adsorbate). This sinter-reactive lanthanum chromite is crystalline, has the formula LaCr$_{1-x}$M$_x$O$_3$, where M is selected from the group consisting of zinc, copper and mixtures thereof and x ranges from 0.02 to 0.20, and sinters to densities higher than about 95% of theoretical density at temperatures as low as 1400° C. in air.

In still another embodiment, the invention provides a process for preparing the sinter-reactive lanthanum chromite from the precursor lanthanum chromite powder obtained via the process defined in steps (a) through (d) by calcining in air in the temperature range of 650° to 1100° C. for 0.5 to 5 hours and by deagglomerating the calcined powder by any suitable size-reduction process such as ball-milling, attrition milling, etc. The resultant crystalline, fine-grain powder having the formula LaCr$_{1-x}$M$_x$O$_3$ is often referred to as M-doped lanthanum chromite.

The M-doped lanthanum chromite powder may be formed into powder compacts or components by any suitable method such as uniaxial pressing, cold isostatic pressing, slip-casting or die pressing, and sintered in air at temperatures as low as 1400° C. to obtain dense lanthanum chromite having a density higher than about 95% of theoretical.

DETAILED DESCRIPTION OF THE PREFERRED EMBODIMENTS

Set forth hereinafter in more detail is a description of the elements to which the present invention relates, namely, the lanthanum chromite precursor, the process for preparing this precursor, the sinter-reactive lanthanum chromite, and the process for preparing the sinter-reactive lanthanum chromite.

The lanthanum chromite precursor powder is amorphous or microcrystalline and has the empirical formula LaCr$_{1-x}$M$_x$O$_3$ (Adsorbate) where M is a divalent metal selected from the group consisting of zinc, copper and mixtures thereof, x ranges from 0.02 to 0.20, and Adsorbate is volatile matter which is adsorbed on the powder. The composition of the adsorbate is not precisely known but consists of water, alcohols and other organic adducts. The amount of the adsorbate may be up to about 35 weight percent of the total as-produced lanthanum chromite precursor.

Accordingly, a first step in preparing the lanthanum chromite precursor is reacting a solution of lanthanum and chromium with a solution of ammonium hydroxide. It is necessary that the atomic ratio of lanthanum and chromium in the solution be the same as that of the precursor compound, that is $1:1-x$. The liquid used to make the solutions may be deionized (DI) water, organic solvents, such as monohydric alcohols, or their mixture, with isopropyl alcohol being the preferred solvent. Any compounds of lanthanum and chromium may be used to make the solutions provided these compounds have sufficient solubility in the chosen solvent.

When the desired solvent is water, the compounds of lanthanum and chromium used to make the solutions may be, but are not limited to, chloride, nitrate, acetate, etc., salts. These salts include but are not limited to lanthanum chloride, lanthanum bromide, lanthanum nitrate, lanthanum acetate, chromium chloride, chromium bromide, chromium nitrate, chromium acetate. It is not necessary that the salts used in the preparation of the solution have a common anion.

An intermediate insoluble hydroxide with lanthanum and chromium in atomic ratio corresponding to that of the precursor or final lanthanum chromite, that is, ratio of $1:1-x$ is coprecipitated by mixing a solution of the desired compounds with a solution containing a stoichiometric excess of ammonium hydroxide. Precipitation of these metals at pH of 9 to 10 is essentially quantitative. The solution containing the metal salts is added to the solution of ammonium hydroxide under vigorous stirring or vice versa. However, addition of the metal salt solution to the hydroxide solution is the preferred method of mixing the solutions for coprecipitation. The metal salts may be dissolved in one solution or in separate solutions. In the case of separate metal solutions, the solutions should be added simultaneously, at the same location and the molar feed rates of the metals should correspond to the atomic ratio of the metals in the precursor and final lanthanum chromite.

The insoluble hydroxide intermediate, i.e. the coprecipitate formed from mixing the lanthanum and chromium solution with the ammonium hydroxide solution according to the method of the present invention, contains the lanthanum and chromium metals in the same atomic ratio as the final lanthanum chromite. This coprecipitate is voluminous, may be gelatinous, and, at high metal concentration, may turn into a rigid gel. However, it is preferred that the metal concentration be controlled at such levels that the precipitate forms a dispersion of high fluidity and this dispersion will be referred to as gel. In this context, the word gel is meant to denote a dispersion or slurry of precipitated or coprecipitated particles, which are aggregates of nanometer-size particles, in a liquid phase. The solids concentration and the viscosity of this dispersion are such that the gel flows relatively easily, is fairly stable, and can be pumped by any conventional slurry pump, such as a diaphragm pump.

The gel or slurry obtained from the coprecipitation step is then subjected to washings with deionized (DI) water, DI water/alcohol or mixtures to remove the anions, that is, chlorides, bromides, nitrates or acetates from the lanthanum and chromium compounds used in the preparation of the hydroxide intermediate. This washing may be performed using batch or continuous processes. In a laboratory-scale batch process, the slurry is diluted with the appropriate wash liquid and stirred, and the precipitate is allowed to settle by gravity. The clear supernatant liquid containing the soluble anions is then decanted, and the wash process is repeated until the anion concentration is sufficiently low. Precipitates from halides, need to be washed thoroughly because residual halides in the final ceramic powder may degrade the powder's sintering behavior or mechanical properties. Thorough washing of nitrate or acetate anions is not necessary because residual amounts of such anions are easily removed during subsequent calcination steps. The composition of the wash liquid is progressively changed from DI water to alcohol in order to have the precipitate dispersed in a water-/alcohol mixture with the concentration of water at about 20 w % or less at the end. Any alcohol may be used but monohydric alcohols with low molecular weight are preferred. Isopropanol, a widely used chemical solvent, is the most preferred alcohol.

To the slurry of the washed hydroxide gel is then added a solution of an M compound where M is a divalent metal such as selected from the group consisting of zinc, copper and the compounds may be nitrate, acetate, or other soluble inorganic or organic salts which decompose at temperatures in the range of 200° to 600° C. The quantity of the M compound solution which is used should be such that the atomic ratio of the lanthanum and chromium in the hydroxide precipitate and M in the solution should be the same as the desired composition in the precursor or the final ceramic lanthanum chromite, that is, La:Cr:M should be equal to $1:1-x:x$.

The water/alcohol slurry of the precipitated hydroxide and the dissolved M compound is then subjected to a supercritical separation. In other words, the powder is released from the liquid at temperature and pressure equal to or greater than the critical point of the water-/alcohol liquid in a batch or continuous process. Under supercritical conditions the surface tension of the liquid is about zero, the solid particles are released from the liquid phase without compaction and, therefore, the powder is in a highly divided state, i.e., the size of the particles is of the order of one nanometer. The powder which is produced from the supercritical separation is usually amorphous and retains adsorbed water and organic molecules. This powder is the precursor lanthanum chromite with empirical formula $LaCr_{1-x}M_xO_3$ (Adsorbate) where Adsorbate is adsorbed volatile matter consisting of water, alcohols such as isopropanol, and other organic adducts whose composition is not precisely known. In a slight variation of the process described hereandabove, the divalent metal could be added after the supercritical solid/liquid separation of the lanthanum/chromium hydroxides by impregnation of the as-produced or calcined powder with a solution containing the divalent metal but this approach would offer no real or practical advantages over the preferred method of adding it prior to the supercritical solid/liquid separation.

Sinter-reactive lanthanum chromite powder with chemical formula $LaCr_{1-x}M_xO_3$, where M is a divalent metal selected from the group consisting of zinc, copper and mixtures thereof and x is in the range of 0.02 to 0.20, is prepared from the lanthanum chromite precursor which is produced according to the present invention as discussed hereandabove. To this end, the lanthanum chromite precursor powder is subjected to calcination in air to release adsorbed water and organic adducts and to crystallize the powder followed by deagglomeration of the calcined powder to reduce its particle size distribution.

In heating up the lanthanum chromite precursor in air the major weight loss of adsorbate usually occurs below 400° C. with complete burn off at temperatures of about 550° C. Calcination of the powder at about 550° C. in air for 2 hours converts the amorphous powder to a crystalline material which is a mixture of lanthanum chromite, huttonite with chemical formula isostructural to $LaCrO_4$, and small amounts of lanthanum chromium oxide with chemical formula isostructural to $La_2CrO_6$. On the other hand, calcination of the precursor powder at 750° C. in air for 2 hours leads to the formation of perovskite lanthanum chromite with only trace quantities of huttonite ($LaCrO_4$) and lanthanum chromium oxide (with chemical formula isostructural to $La_2CrO_6$) which completely disappear during densification. The calcination temperature and time are selected to tailor make the ceramic powder to the requirements of specific ceramic green forming processes. Generally, calcination of the lanthanum chromite precursor powder at a temperature ranging from 650° to 1100° C. for 0.5 to 5 hours followed by deagglomeration yields sinter-reactive lanthanum chromite powders with composition $LaCr_{1-x}M_xO_3$ where M is selected from the group consisting of zinc, copper and mixtures thereof and x ranges from 0.02 to 0.20.

The sinterability of lanthanum chromite powders prepared according to the present invention is much better than the sinterability of powders prepared by other state-of-the-art processes. Densities of at least 95% of theoretical have been obtained at sintering temperatures as low as 1400° C. Powder compacts for sintering can be formed by well known processes such as uniaxial pressing, cold isostatic pressing, extrusion, injection molding, roll pressing, and other ceramic forming techniques.

In summary, the present invention consists of the preparation of a fine hydroxide gel by coprecipitation techniques from salt solutions of lanthanum and chromium, which are taken in the required stoichiometry, with ammonia. The resultant hydroxide gel is washed with deionized water/alcohol to remove the anions while the pH is maintained highly alkaline (i.e. pH greater than 8). To the washed slurry of the hydroxide gel is then added a solution of a divalent metal salt, such as zinc nitrate, which does not precipitate quantitavely at the high pH required for quantitative lanthanum and chromium precipitation.

The slurry is then subjected to a supercritical solid/liquid separation in a batch or, preferably, continuous process. The supercritical powder/liquid separation ensures that the dissolved zinc dopant is uniformly and quantitatively distributed on the lanthanum chromite precursor and, therefore, eliminates loss of zinc during washing. In addition, the separation of the powder from the liquid under supercritical conditions eliminates the effects of surface tension completely and yields an extremely fine powder. This fine powder upon calcination yields high surface area, submicron grain crystalline powders which sinter to near full density at temperatures as low as 1400° C.

In order to more fully describe the advantages to be derived from the present invention, the following examples are set forth. These examples are considered to be illustrative only and are not intended to limit the scope and content of the invention as defined by the subjoined claims.

EXAMPLE 1

A six-gallon polyethylene container was loaded with four (4) liters of isopropanol (2-propanol) and one and one half (1.5) liters of concentrated ammonium hydroxide which typically contains 28–30 w % ammonia. This ammonia/water/isopropanol solution is denoted as solution A. In another container a solution of lanthanum nitrate and chromium nitrate was prepared by dissolving 450.7 grams of $La(NO_3)_3.6H_2O$ and 374.8 grams of $Cr(NO_3)_3.9H_2O$ in 7.5 liters of isopropanol and 0.4 liters of DI water. The resultant solution of lanthanum and chromium nitrates is denoted as solution B.

Solution B was added to solution A dropwise over a period of about 30 minutes under vigorous stirring with a shear mixer rotating at about 1500 revolutions per minute. A voluminous, greenish precipitate of lanthanum/chromium hydroxides formed instantaneously. This precipitate was kept well dispersed by maintaining the pH greater than about 9 (using excess ammonia) throughout the precipitation step and by the vigorous stirring. The latter also provided for uniform pH conditions and, therefore, instantaneous precipitation of the lanthanum/chromium hydroxides throughout this step.

The lanthanum/chromium hydroxide precipitate or gel was then subjected to several washes with DI water/isopropanol (15 volume percent DI water) mixtures by batch gravity settling methods to reduce the nitrate concentration to less than about 3 percent of its initial value.

To the washed hydroxide gel were added 30.96 grams of zinc nitrate hexahydrate ($Zn(NO_3)_2.6H_2O$) dissolved in one (1) liter isopropanol under rigorous stirring. The resultant gel was then subjected to solid/liquid separation using the continuous process described in U.S. Pat. No. 4,845,056 to obtain the lanthanum chromite precursor, $LaCr_{0.9}Zn_{0.1}O_3$ (Adsorbate), powder. This precursor powder was amorphous and in a highly divided state as indicated by its high surface area (about 150 $m^2/g$).

EXAMPLE 2

A six-gallon polyethylene container was loaded with four (4) liters of isopropanol (2-propanol) and two (2) liters of concentrated ammonium hydroxide which typically contains 28–30 w % ammonia. This ammonia/water/isopropanol solution is denoted as solution A. In another container a solution of lanthanum nitrate and chromium nitrate was prepared by dissolving 450.7 grams of $La(NO_3)_3.6H_2O$ and 354.0 grams of $Cr(NO_3)_3.9H_2O$ in eight (8) liters of isopropanol and 0.5 liters of DI water. The resultant solution of lanthanum and chromium nitrates is denoted as solution B.

Solution B was added to solution A dropwise over a period of about 25 minutes under vigorous stirring with a shear mixer rotating at about 1500 revolutions per minute. A voluminous, greenish precipitate of lanthanum/chromium hydroxides formed instantaneously. This precipitate was kept well dispersed by maintaining the pH greater than about 9 (using excess ammonia) throughout the precipitation step and by the vigorous stirring. The latter also provided for uniform pH conditions and, therefore, instantaneous precipitation of the lanthanum/chromium hydroxides throughout this step.

The lanthanum/chromium hydroxide precipitate or gel was then subjected to several washes with DI water/isopropanol (15 volume percent DI water) mixtures by batch gravity settling methods to reduce the nitrate concentration to less than about 3 percent of its initial value.

To the washed hydroxide gel were added 46.44 grams of zinc nitrate hexahydrate $(Zn(NO_3)_2 \cdot 6H_2O)$ dissolved in one (1) liter isopropanol under rigorous stirring. The resultant gel was then subjected to solid/liquid separation using the continuous process described in U.S. Pat. No. 4,845,056 to obtain the lanthanum chromite precursor, $LaCr_{0.85}Zn_{0.15}O_3$ (Adsorbate), powder. This precursor powder was amorphous and in a highly divided state as indicated by its high surface area (about $150^2/g$).

EXAMPLE 3

The lanthanum chromite precursor powder, $LaCr_{0.9}Zn_{0.1}O_3$ (Adsorbate), prepared as described in Example 1 was subjected to calcination in air at 850° C. for 3 hours to yield a ceramic powder with surface area of 4.5 m$^2$/g. As a result of the calcination adsorbed water and organic adducts on the precursor powder were removed or burnt off and the precursor crystallized into zinc-doped lanthanum chromite having the nominal composition $LaCr_{0.9}Zn_{0.1}O_3$.

EXAMPLE 4

The lanthanum chromite precursor powder, $LaCr_{0.9}Zn_{0.1}O_3$ (Adsorbate), prepared as described in Example 1 was subjected to calcination in air at 800° C. for 3 hours to yield a ceramic powder with surface area of 15 m$^2$/g. As a result of the calcination adsorbed water and organic adducts on the precursor powder were removed or burnt off and the precursor crystallized into zinc-doped lanthanum chromite having the nominal composition $LaCr_{0.9}Zn_{0.1}O_3$.

EXAMPLE 5

A small quantity (about 1 gram) of the as-calcined powder from Example 4, zinc-doped lanthanum chromite $LaCr_{0.9}Zn_{0.1}O_3$, was uniaxially pressed into a 12 mm diameter disk having a green density of 48.7% of theoretical. The disk was fired in air at 1400° C. for 1 hour (14 hours to 1400° C., 1 hour at 1400° C., 7 hours to room temperature) and after firing was found to have a density of 82.6% of theoretical.

EXAMPLE 6

The lanthanum chromite precursor powder, $LaCr_{0.85}Zn_{0.15}O_3$ (Adsorbate), prepared as described in Example 2 was subjected to calcination in air at 800° C. for 3 hours to yield a ceramic powder with surface area of 8 m$^2$/g. As a result of the calcination adsorbed water and organic adducts on the precursor powder were removed or burnt off and the precursor crystallized into zinc-doped lanthanum chromite having the nominal composition $LaCr_{0.85}Zn_{0.15}O_3$.

EXAMPLE 7

A small quantity (about 1 gram) of the as-calcined powder from Example 6, zinc-doped lanthanum chromite $LaCr_{0.85}Zn_{0.15}O_3$, was uniaxially pressed into a 12 mm diameter disk having a green density of 48.1% of theoretical. The disk was fired in air at 1400° C. for 1 hour (14 hours to 1400° C., 1 hour at 1400° C., 7 hours to room temperature) and after firing was found to have a density of 94.8% of theoretical.

To the best of our knowledge, this is the highest density ever achieved in the sintering of lanthanum chromite powders at this very low temperature of 1400° C. in air. It is worth noting that the density of 94.8% of theoretical obtained at 1400° C. in air with the lanthanum chromite powder prepared according to the present invention is about the same as the density of 95.3% of theoretical obtained at 1740° C. under inert atmosphere by Groupp and Anderson. It is also important to note that the density of 94.8% is only slightly lower than the density of about 98% of theoretical achieved at 1600° C. for 2 hours in air according to the data of Hayashi et al., although the latter authors pressed their disks to a green density of about 60% of theoretical as compared to the 48.1% of the present invention.

EXAMPLE 8

Precursor lanthanum chromite powder without any dopant, that is, $LaCrO_3$ (Adsorbate), was prepared as described in Example 1. This precursor powder was then doped with copper by the following procedure. A solution of 1.55 grams of $La(NO_3)_3 \cdot 6H_2O$ and 0.8675 grams of $Cu(NO_3)_2 \cdot 3H_2O$ in 3 grams of DI water/27 grams of isopropanol was added to a suspension of 10 grams the precursor $LaCrO_3$ (Adsorbate), this being equivalent to 7.72 grams of $LaCrO_3$, in 100 grams of isopropanol. To the resultant suspension/solution there was added 2 ml of concentrated ammonia under stirring and the mass was allowed to dry in air overnight. The dried powder was calcined in air at 800° C. for 3 hours to obtain a crystallized powder having the nominal composition $LaCr_{0.9}Cu_{0.1}O_3$.

EXAMPLE 9

A small quantity (about 1 gram) of the as-calcined powder from Example 8, copper-doped lanthanum chromite $LaCr_{0.9}Cu_{0.1}O_3$, was uniaxially pressed into a 12 mm diameter disk having a green density of 49.1% of theoretical. The disk was fired in air at 1400° C. for 1 hour (14 hours to 1400° C., 1 hour at 1400° C., 7 hours to room temperature) and after firing was found to have a density of 95.9% of theoretical. Again, this degree of densification is much better than what has ever been achieved in the sintering of copper-doped lanthanum chromite powders at the very low temperature of 1400° C., and, in particular, it is about the same as that achieved by Hayashi et al. at 1600° C.

Having thus described the invention in rather full detail, it will be understood that such detail need not be strictly adhered to but that further changes may suggest themselves to one having ordinary skill in the art, all falling within the scope of the invention as defined by the subjoined claims.

We claim:

1. A process for the preparation of sinter-reactive lanthanum chromite doped with divalent metals having the formula $LaCr_{1-x}M_xO_3$ where M is a divalent metal selected from the group consisting of zinc, copper and mixtures thereof, and x ranges from 0.02 to 0.20, said process comprising the steps of:
   i. preparing a lanthanum chromite precursor having the empirical formula $LaCr_{1-x}M_xO_3$ (Adsorbate) where M is selected from the group consisting of zinc, copper and mixtures thereof, x ranges from 0.02 to 0.20, and Adsorbate is volatile matter, which is adsorbed on the powder and which is present up to 35 weight % based on total precursor weight, said precursor being prepared by a process comprising the steps of:
(a) reacting a solution containing a lanthanum compound and a chromium compound in an atomic ratio of La:Cr of $1:1-x$ with a stoichiometric excess of ammonium hydroxide to precipitate an intermediate hydroxide in the form of a slurry;
(b) washing the precipitated intermediate hydroxide with a wash liquid comprising deionized (DI) water and DI water/alcohol mixtures to remove most of the anions from the lanthanum and chromium compounds used in step (a) and to yield a slurry in a water/alcohol liquid;
(c) adding to the hydroxide slurry obtained in step (b) a solution of an M compound taken in such quantity as to yield an atomic ratio of La:Cr:M of $1:1-x:x$ where M is a divalent metal selected from the group consisting of zinc, copper and mixtures thereof and operative as a dopant;
(d) separating the powder from the water/alcohol liquid at supercritical conditions wherein temperature and pressure are equal to or greater than the critical point of the water/alcohol liquid in a batch or continuous process to obtain precursor lanthanum chromite powder with empirical formula $LaCr_{1-x}M_xO_3$ (Adsorbate); and
ii. calcining the lanthanum chromite precursor having the empirical formula $LaCr_{1-x}M_xO_3$ (Adsorbate) at a temperature ranging from 650° to 1100° C. for a time period ranging from 0.5 to 4 hours followed by deagglomeration to obtain a sinter-reactive ceramic powder having the chemical formula $LaCr_{1-x}M_xO_3$.

2. The process of claim 1 in which M is zinc.

3. The process of claim 1 in which M is copper.

4. The process of claim 1 in which said alcohol contains 1 to 5 carbon atoms.

5. The process of claim 1 in which said alcohol is isopropanol.

* * * * *